US012663920B2

(12) United States Patent
Uy et al.

(10) Patent No.: US 12,663,920 B2
(45) Date of Patent: Jun. 23, 2026

(54) DYNAMICALLY EXPOSING REPETITIVELY USED DATA IN A USER INTERFACE

(71) Applicant: Google LLC, Mountain View, CA (US)

(72) Inventors: Michael Uy, Mountain View, CA (US); William Levi Frohn, Kenmore, WA (US)

(73) Assignee: Google LLC, Mountain View, CA (US)

( * ) Notice: Subject to any disclaimer, the term of this patent is extended or adjusted under 35 U.S.C. 154(b) by 246 days.

(21) Appl. No.: 18/625,713

(22) Filed: Apr. 3, 2024

(65) Prior Publication Data

US 2024/0248599 A1 Jul. 25, 2024

Related U.S. Application Data

(63) Continuation of application No. 17/257,785, filed as application No. PCT/US2019/042007 on Jul. 16, 2019, now abandoned.

(Continued)

(51) Int. Cl.
*G06F 3/04886* (2022.01)
*G06F 3/023* (2006.01)
(Continued)

(52) U.S. Cl.
CPC ........ *G06F 3/04886* (2013.01); *G06F 3/0236* (2013.01); *G06F 3/0481* (2013.01); *G06F 3/0484* (2013.01)

(58) Field of Classification Search
CPC ................ G06F 3/048; G06F 3/04886; G06F 3/0481–0483; G06F 3/0484–0486; G06F 3/0233–0237; G06F 3/0236; G06F 3/018
See application file for complete search history.

(56) References Cited

U.S. PATENT DOCUMENTS

2004/0083198 A1   4/2004   Bradford et al.
2009/0265669 A1   10/2009   Kida et al.
(Continued)

FOREIGN PATENT DOCUMENTS

CN          106687889        5/2017
WO     WO 2017184217       10/2017

OTHER PUBLICATIONS

International Preliminary Report on Patentability in International Appln. No. PCT/US2019/042007, mailed on Dec. 23, 2021, 8 pages.

(Continued)

*Primary Examiner* — Liang Y Li
(74) *Attorney, Agent, or Firm* — Fish & Richardson P.C.

(57) ABSTRACT

Methods, systems, and apparatus, including computer programs encoded on a computer storage medium, for enhancing user interaction with an interface are described. In one aspect, a method includes displaying a keyboard layer of a user interface that includes a keyboard having at least one user interface element configured to receive a user input. An initial input at a given user interface element is detected. In response to detecting the initial interaction, a first portion of a symbol layer of the user interface is revealed while maintaining display of the keyboard layer of the user interface. A subsequent input at the given user interface element is detected. In response to detecting the subsequent input, a larger portion of the symbol layer of the user interface is revealed while maintaining a position of the first portion of the symbol layer that was previously revealed in response to detecting the initial input.

20 Claims, 6 Drawing Sheets

Related U.S. Application Data

(60) Provisional application No. 62/860,377, filed on Jun. 12, 2019.

(51) Int. Cl.
      *G06F 3/0481*    (2022.01)
      *G06F 3/0484*    (2022.01)

(56)              References Cited

U.S. PATENT DOCUMENTS

| | | | |
|---|---|---|---|
| 2010/0125811 A1* | 5/2010 | Moore | G06F 3/0482 |
| | | | 715/846 |
| 2012/0019446 A1* | 1/2012 | Wu | G06F 3/0237 |
| | | | 345/173 |
| 2012/0299835 A1* | 11/2012 | Yoshida | G06F 3/04886 |
| | | | 345/173 |
| 2013/0086505 A1 | 4/2013 | De Paz et al. | |
| 2013/0305178 A1 | 11/2013 | Matsuzawa et al. | |
| 2014/0028562 A1* | 1/2014 | St. Clair | G06F 3/04845 |
| | | | 345/168 |
| 2015/0100537 A1 | 4/2015 | Grieves et al. | |
| 2015/0134642 A1* | 5/2015 | Chomley | G06F 16/3344 |
| | | | 707/722 |
| 2016/0070441 A1 | 3/2016 | Paek et al. | |
| 2016/0070466 A1* | 3/2016 | Chaudhri | H04M 1/724 |
| | | | 715/765 |
| 2017/0075878 A1 | 3/2017 | Jon et al. | |
| 2018/0136794 A1 | 5/2018 | Cassidy et al. | |
| 2018/0164963 A1 | 6/2018 | Ku et al. | |
| 2018/0336715 A1 | 11/2018 | Rickwald et al. | |
| 2020/0379638 A1 | 12/2020 | Zhu et al. | |

OTHER PUBLICATIONS

International Search Report and Written Opinion in International Appln. No. PCT/US2019/042007, mailed on Mar. 13, 2020, 13 pages.

Office Action in Chinese Appln. No. 201980011144.8, mailed on Feb. 3, 2024, 11 pages (with English translation).

Office Action in European Appln. No. 19752304.6, mailed on Dec. 17, 2021, 4 pages.

Office Action in Indian Appln. No. 202027032158, mailed on Dec. 27, 2023, 3 pages (with English translation).

Office Action in Indian Appln. No. 202027032158, mailed on Jan. 18, 2022, 6 pages (with English translation).

* cited by examiner

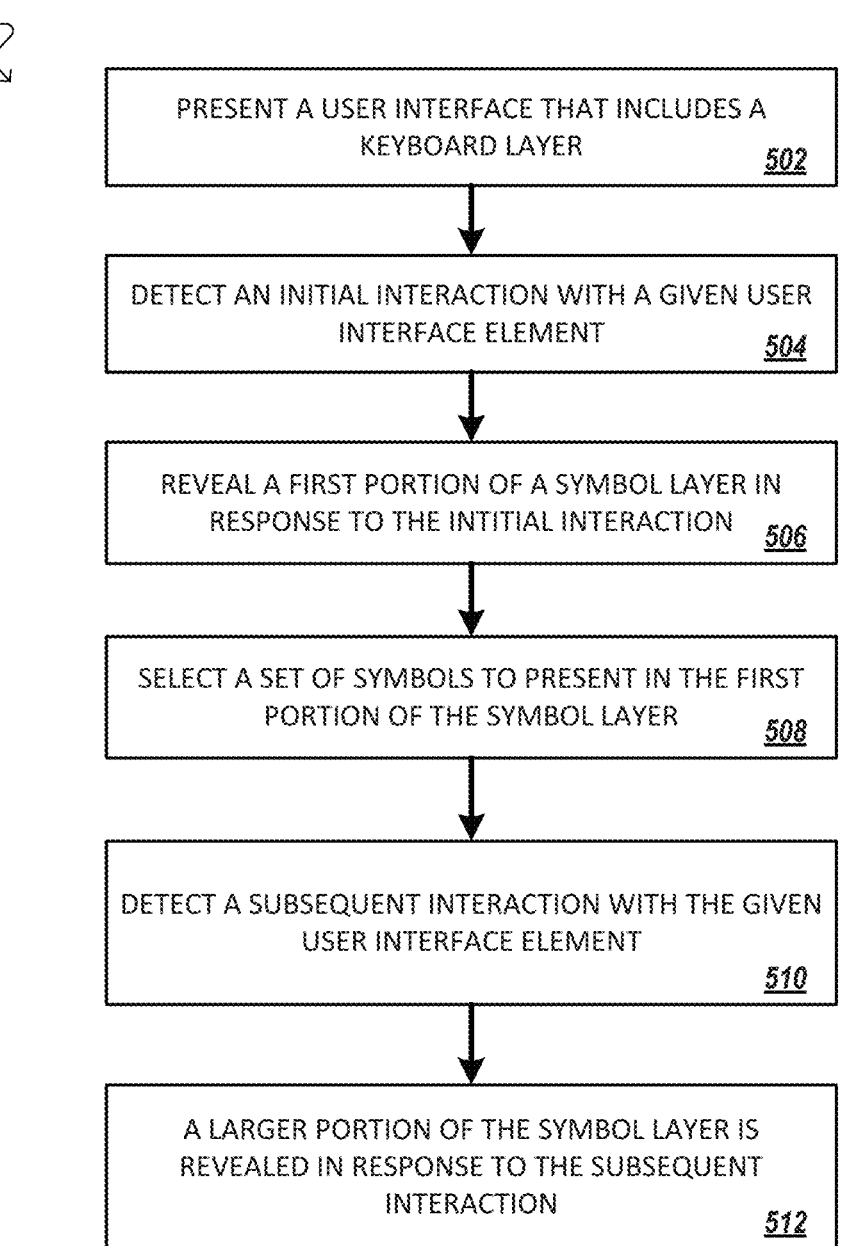

*500*

PRESENT A USER INTERFACE THAT INCLUDES A
KEYBOARD LAYER                                      *502*

DETECT AN INITIAL INTERACTION WITH A GIVEN USER
INTERFACE ELEMENT                                  *504*

REVEAL A FIRST PORTION OF A SYMBOL LAYER IN
RESPONSE TO THE INTITIAL INTERACTION          *506*

SELECT A SET OF SYMBOLS TO PRESENT IN THE FIRST
PORTION OF THE SYMBOL LAYER
                                                   *508*

DETECT A SUBSEQUENT INTERACTION WITH THE GIVEN
USER INTERFACE ELEMENT
                                                   *510*

A LARGER PORTION OF THE SYMBOL LAYER IS
REVEALED IN RESPONSE TO THE SUBSEQUENT
INTERACTION                                        *512*

FIG. 5

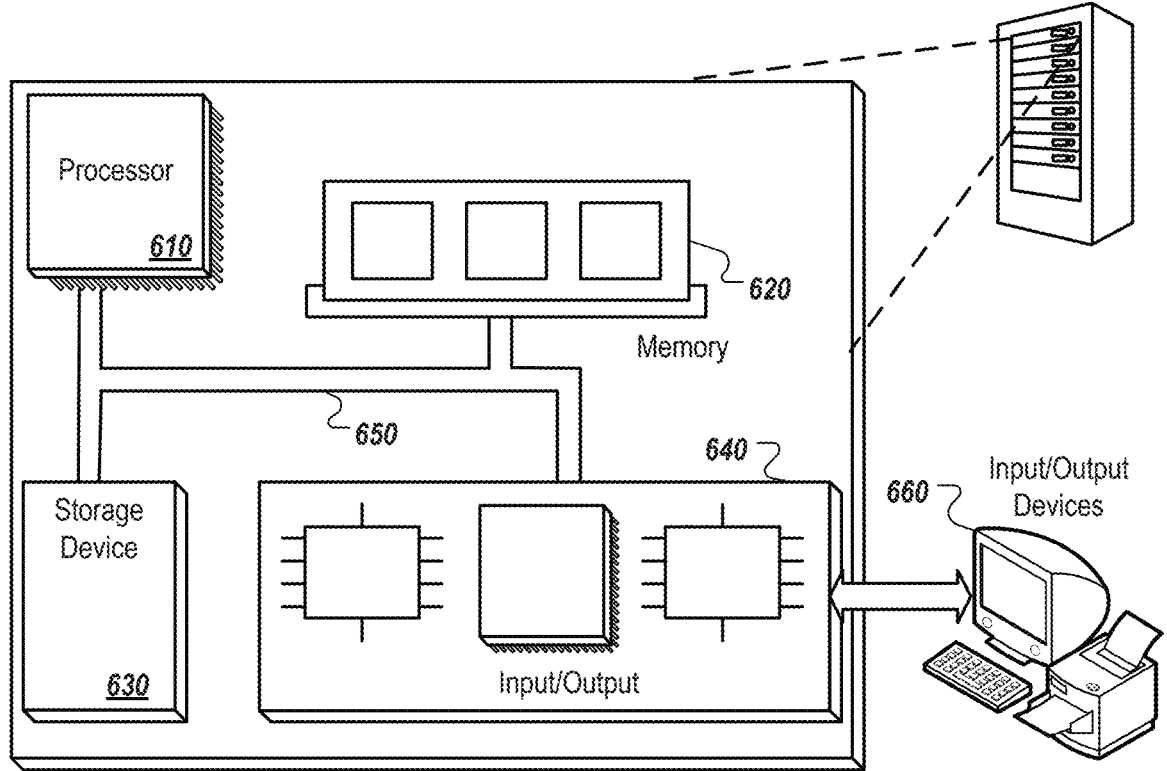
FIG. 6

DYNAMICALLY EXPOSING REPETITIVELY USED DATA IN A USER INTERFACE

CROSS-REFERENCE TO RELATED APPLICATION

This application is a continuation application and claims priority under 35 U.S.C. § 120 to U.S. patent application Ser. No. 17/257,785, filed on Jan. 4, 2021, which application is a National Stage Application under 35 U.S.C. § 371 and claims the benefit of International Application No. PCT/US2019/042007, filed on Jul. 16, 2019, which claims priority to U.S. Provisional Application No. 62/860,377, filed on Jun. 12, 2019. The disclosure of the prior applications are considered part of and are incorporated by reference in the disclosure of this application.

BACKGROUND

This specification relates to data processing and dynamically updating a user interface.

User interfaces enable users to enter and consume data. The user interfaces of some user devices include virtual keyboards (also known as on-screen keyboards), in which a user can interact with a visual representation of a key to input a character displayed within the visual representation of the key. As the use of mobile devices continues to grow, users are spending disproportionately more time working on smaller displays than traditional desktop displays, and are subject to limited experiences confined by the amount of space available for presenting information to users and receiving information from users on these handheld devices. Given the variety of display sizes available and the growing use of smaller displays, it can be difficult to render virtual keyboards effectively and other supporting data input methodologies.

SUMMARY

In general, one aspect of the subject matter described in this specification can be embodied in methods including the operations of displaying, in a user interface, a keyboard layer of a user interface that includes a keyboard having at least one user interface element configured to receive a user input; detecting an initial input at a given user interface element; revealing, in response to detecting the initial interaction, a first portion of a symbol layer of the user interface while maintaining displaying of the keyboard layer of the user interface, the symbol layer having at least one user interface element configured to receive a user input indicative of a symbol; detecting a subsequent input at the given user interface element; revealing, in response to detecting the subsequent input, a larger portion of the symbol layer of the user interface while maintaining a position of the first portion of the symbol layer that was previously revealed in response to detecting the initial input, wherein revealing the larger portion of the symbol layer occludes at least a portion of the keyboard layer. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Revealing a first portion of a symbol layer can include revealing at least one row of user interface elements, each user interface element in the row being configured to receive a user input indicative of a frequently used symbol, and wherein the row is displayed at a location above the keyboard.

Revealing a first portion of a symbol layer can include revealing at least one row of user interface elements, each user interface element in the row being configured to receive a user input indicative of an emoji, a Hanzi character, a shape, or a web design widget.

Methods can include the operations of selecting a set of symbols that are included in the first portion of the symbol layer based on a frequency of use of symbols that are included in the larger portion of the symbol layer. Selecting the set of symbols can include identifying a particular symbol having a highest frequency of use; including a user interface element configured to receive a user input indicative of the particular symbol at a first position of the first portion of the symbol layer; identifying a set of additional symbols each having a frequency of use that is lower than the particular symbol, but higher than remaining symbols in the symbol layer; and including a plurality of user interface elements each configured to receive a user input indicative of a respective one of the set of additional symbols in other positions of the first portion of the symbol layer.

Identifying the particular symbol having the highest frequency of use can be based on frequency of use data collected from a different application than a particular application that causes the first portion of the symbol layer to be displayed.

Methods can include the operations of, prior to receiving a user input at the symbol layer, initially populating the first portion of the symbol layer with a default set of symbols; in response to an initial set of user inputs at the symbol layer, updating the first portion of the symbol layer to include a user interface element configured to receive the user input indicative of the particular symbol having the highest frequency of use at the first position of the first portion of the symbol layer while the first portion of the symbol layer remains displayed.

Methods can include the operations of determining the default set of symbols based on one or more of a machine learning model that provides a set of recommended symbols, contextual information about a current user session, or based on a set of user-specified preferences.

Particular embodiments of the subject matter described in this specification can be implemented so as to realize one or more of the following advantages. For example, some embodiments discussed throughout this document enable intuitive access to user interface features in a limited display area by cycling through different user interface states in response to sequential user interaction with a particular user interface element. More specifically, some embodiments discussed throughout this document reveal different portions of a symbol input interface as a user continues to interact with a user interface element (e.g., button or icon) that triggers presentation of the symbol input interface. In some situations, the first interaction with the user interface element reveals only a peek view of the symbol input interface, which can include only a single row of most frequently and/or recently used symbols, thereby providing a user access to the single row of symbols, while also providing the user access to a different input interface that was presented prior to the interaction. Subsequent interactions can reveal more of the symbol input interface and/or replace (hide) the different interface. As discussed in more detail below, the series of user interface transitions not only provides varying levels of access to multiple different input interfaces as desired by the user, but also conveys information as to the transitions taking place without having to expressly communicate that information to the user. This provides a more efficient use of a limited display area. The use of layers to define the various aspects of the user interface enables efficient transition between the different user interface states by enabling the various aspects to be defined in specific layers, and then either revealed or hidden based on the interactions with the user interface. This simplifies the ability to transition between the user interface states using a variety of visual effects during the transitions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flow chart of an example process for implementing the user interfaces and transitions.

FIG. 6 is a block diagram of an example computer system.

Like reference numbers and designations in the various drawings indicate like elements.

DETAILED DESCRIPTION

Figure 1:
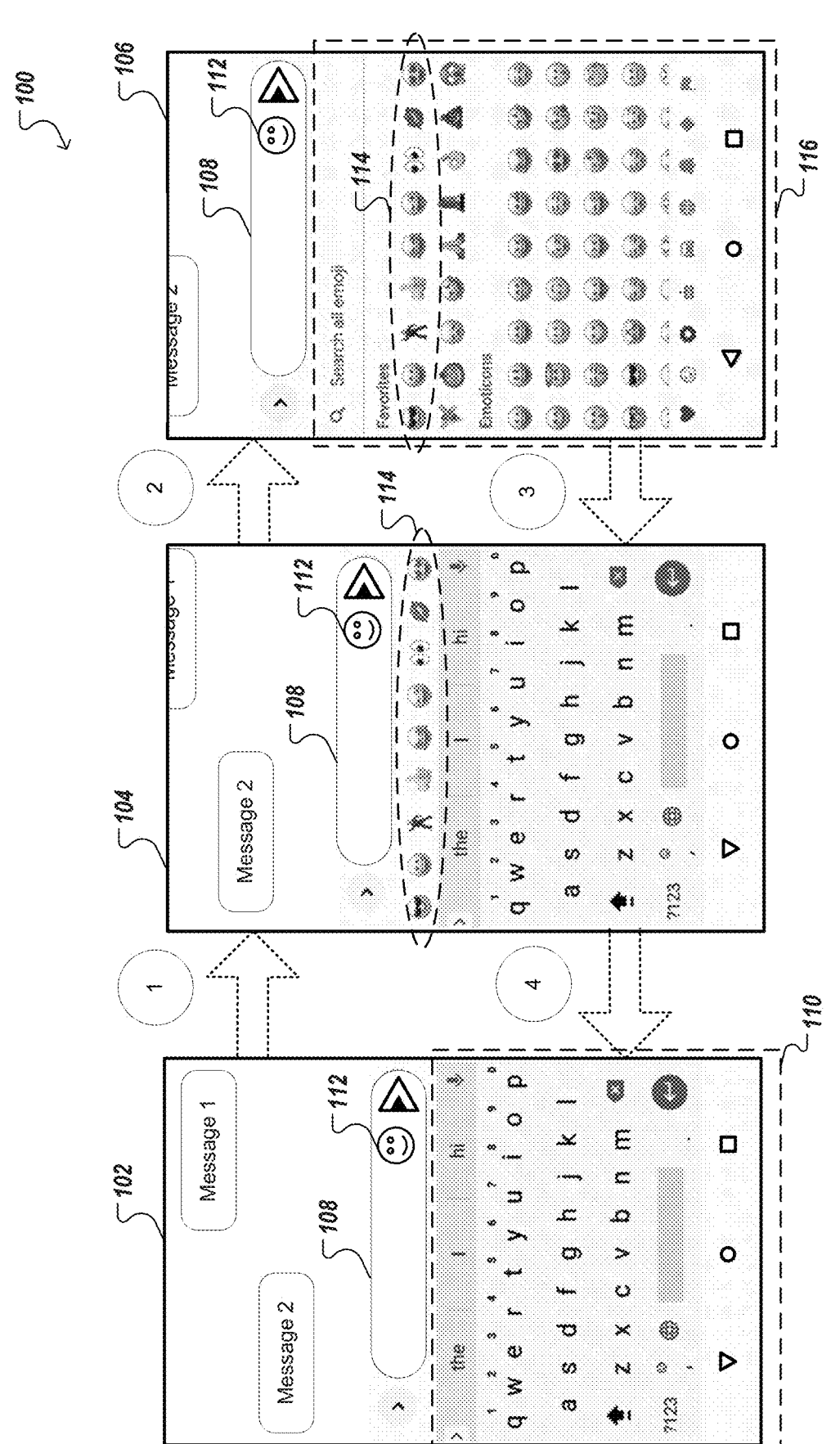
FIG. 1 is a block diagram of a series of user interfaces illustrating an example transition between user interface states.

This document discloses methods, systems, apparatus, and computer readable media that improve user interfaces by improving user access to user interface features. More specifically, the user interfaces discussed herein may enable a user to access a subset of symbols that are frequently used and/or otherwise designated for presentation while a default keyboard (or user interface layer) is presented. The user interfaces discussed herein may also enable the user to quickly transition from the default keyboard to the full symbol keyboard in a seamless fashion, and using animations that intuitively communicate the relationship between the various views throughout the transition. The techniques used to implement these transitions between different user interface features (e.g., different keyboards) reduce the amount of time and the number of interactions required by the user to access the features provided in the different user interfaces. Additionally, the user interfaces may dynamically adjust so that functionality that is used more often by a particular user is repositioned within the user interface so that access to that the functionality is more easily accessible to the user. These user interfaces are particularly useful in the context of mobile devices or other devices having limited display space, so that the user is provided access to features that are more likely to be used by that user.

In some implementations, the user interfaces initially present a keyboard layer of the user interface that presents a keyboard in the display. For example, a user can focus (e.g., tap in) a text entry box, which can initiate presentation of a standard keyboard. The standard keyboard may be a virtual keyboard having a plurality of virtual keys, where each key is configured to receive a user input. The user input may be indicative of, for example, a character of the ASCII or ISO/IEC 8859-1 character sets. The virtual keyboard may have a QWERTY layout (or a portion thereof) or may have some or all of any other suitable layout. When the user interacts with a given user interface element, the presentation of the user interface can transition to a "peek view" in which only a portion (e.g., less than all) of a symbol layer that presents a symbol user interface is presented with the keyboard layer. The symbol user interface may also be a virtual keyboard having a plurality of virtual keys, but each virtual key of the symbol user interface may be configured to receive a user input indicative of a symbol that is not accessible from the standard keyboard. A subsequent user interaction with the given user interface element will cause a transition from the peek view to a full view of the symbol layer, which replaces the presentation of the keyboard layer, and enables the user to interact with a full version of the symbol user interface. Further interaction with the given user interface element can return to the peek view, and then to the presentation of the keyboard layer so that the user can easily access each view through additional interactions with the same given user interface element, as described in more detail below.

FIG. 1 is a block diagram of a series of user interfaces 100 illustrating an example transition between user interface states. The series of user interfaces 100 includes a keyboard interface 102, a peek view interface 104, and a symbol interface 106. The keyboard interface 102 can be a default interface that is presented when a user is interacting with a text entry portion of an application. For example, the keyboard interface 102 can be launched (e.g., revealed) when a user focuses on a text entry area 108. A user can focus on the text entry area 108, for example by tapping at a location of a touchscreen where the text entry area 108 is presented. Other ways of focusing on the text entry area 108 can include using a pointer (e.g., mouse or stylus) to interact with the text entry area 108 or using voice commands to activate the text entry area 108 for data entry.

As discussed in more detail below, the keyboard area 110 of the keyboard interface 102 that is within the dashed rectangle can be implemented as a layer in the overall user interface definition. When the keyboard interface 102 is presented, the layer that includes the keyboard area 110 is fully revealed, and therefore visually perceptible in the keyboard interface 102. This keyboard area 110 enables the user to enter alpha-numeric characters into the text entry area 108 through interaction with the keyboard area 110.

The text entry area 108 includes a given user interface element, in this example a smiley face emoji 112, that triggers a transition between user interface views. In some situations, a first user interaction with the smiley face emoji 112 causes a first transition from the keyboard interface 102 to the peek view interface 104. The peek view interface 104 still includes the keyboard area 110 that was presented in the keyboard interface 102, but also includes a single row of symbols 114 that are presented above the keyboard area 110. In this particular example, the row of symbols 114 is presented between the text entry area 108 and the keyboard area 110, but other arrangements are possible. In some implementations, the row of symbols 114 can be a set of most frequently used symbols, recently used symbols, or favorite symbols. As discussed in more detail with reference to FIG. 3, the symbols that are presented in the row of symbols 114 can be dynamically selected and/or updated based on user interactions and/or contextual data for the user session.

As discussed in more detail below, the row of symbols 114 can be implemented in a different layer of the user interface than the keyboard area 110, and may be just a portion (e.g., less than all) of that different layer. For example, when the user interaction with the smiley face emoji 112 of the keyboard interface 102 is detected, the detected user interaction can trigger execution of a user interface transition routine that causes a specified portion of that different layer to be presented while the keyboard area 110 of the keyboard interface 102 remains presented. The user interface transition routine can also include an animation sequence that causes the text entry area 108 to move up the display to make room for the row of symbols 114 in the peek view interface 104. In this example, a portion of the layer containing the row of symbols 114 remains occluded, e.g., transparent or behind the layer of the user interface in which the keyboard area 110 is defined, such that the keyboard area 110 remains visually perceptible, after the row of symbols 114 of the other layer is revealed.

When the row of symbols 114 is presented, each of the row of symbols 114 and the keyboard area 110 are active for user input. For example, user interaction with any of the symbols presented in the row of symbols 114 will trigger entry of that symbol in the text entry area 108. Similarly, interaction with a character in the keyboard area 110 will trigger entry of that character in the text entry area 108. As such, the peek view interface 104 provides an efficient and effective way in which a user can continue to access the keyboard area 110, while being able to also access symbols from the row of symbols 114.

A subsequent user interaction with the smiley face emoji 112 while the peek view interface 104 is presented triggers a second transition from the peek view interface 104 to the symbol interface 106. The transition to the symbol interface 106 includes presentation of a full symbol keyboard 116, in this example a full emoji keyboard. In some implementations, the transition from the peek view interface 104 to the symbol interface 106 is achieved by revealing the portion of the layer that includes the full symbol keyboard 116 that was not presented in the peek view interface 104. In other words, the layer that includes the full symbol keyboard 116 can be the same layer that includes the row of symbols 114 such that when the full layer (or at least the portion of the layer that includes the full symbol keyboard 116) is revealed, the full symbol keyboard 116 that is visually perceptible in the symbol interface 106 includes the row of symbols 114. The transition from the peek view interface 104 to the symbol interface 106 also includes hiding, or occluding, the layer that includes the keyboard area 110 so that the full symbol keyboard 116 is presented in the portion of the display that previously presented the keyboard area 110, as discussed in further detail below with reference to FIG. 2. In some situations, the keyboard area can be shrunken, e.g., by removing the row of numbers and/or adjusting other spacing of items in the keyboard area, which would also reveal the row of symbols.

When the full symbol keyboard 116 is presented, user interaction with any of the symbols presented in the full symbol keyboard 116 will trigger entry of that symbol into the text entry area 108. Also, a subsequent user interaction with the smiley face emoji 112 will again trigger a transition of the user interface. In some implementations, when the subsequent user interaction occurs while the symbol interface 106 is presented, this interaction triggers a transition back to the peek view interface 104. The transition back to the peek view interface 104 includes again revealing the keyboard area 110 and occluding the portion of the full symbol keyboard 116 that was presented in the portion of the display that presents the keyboard area 110 in the peek view interface 104. The transition back to the peek view interface 104 also includes occluding, or hiding, the full symbol keyboard 116 except for the portion of the full symbol keyboard 116 that includes the row of symbols 114.

After the transition back to the peek view interface 104 from the symbol interface 106, a subsequent user interaction with the peek view interface 104 triggers a transition back to the keyboard interface 102. The transition back to the keyboard interface 102 includes occluding, or hiding, the row of symbols 114. In some implementations, the transition back to the keyboard interface 102 from the peek view interface 104 also includes relocating the text entry area 108 closer to the keyboard area 110 (e.g., relocating the text entry area 108 to a position of the keyboard interface 102 corresponding to the location in the peek view interface 104 where the row of symbols 114 was presented). The relocation of the keyboard interface 102 can include an animation in which the movement of the text entry area 108 down the display toward the keyboard area 110 is visually perceptible. Once the transition to the keyboard interface 102 has completed, further interactions with the smiley face emoji 112 will cycle through the keyboard interface 102, the peek view interface 104, and the symbol interface 106 in the manner discussed above.

Figure 2:
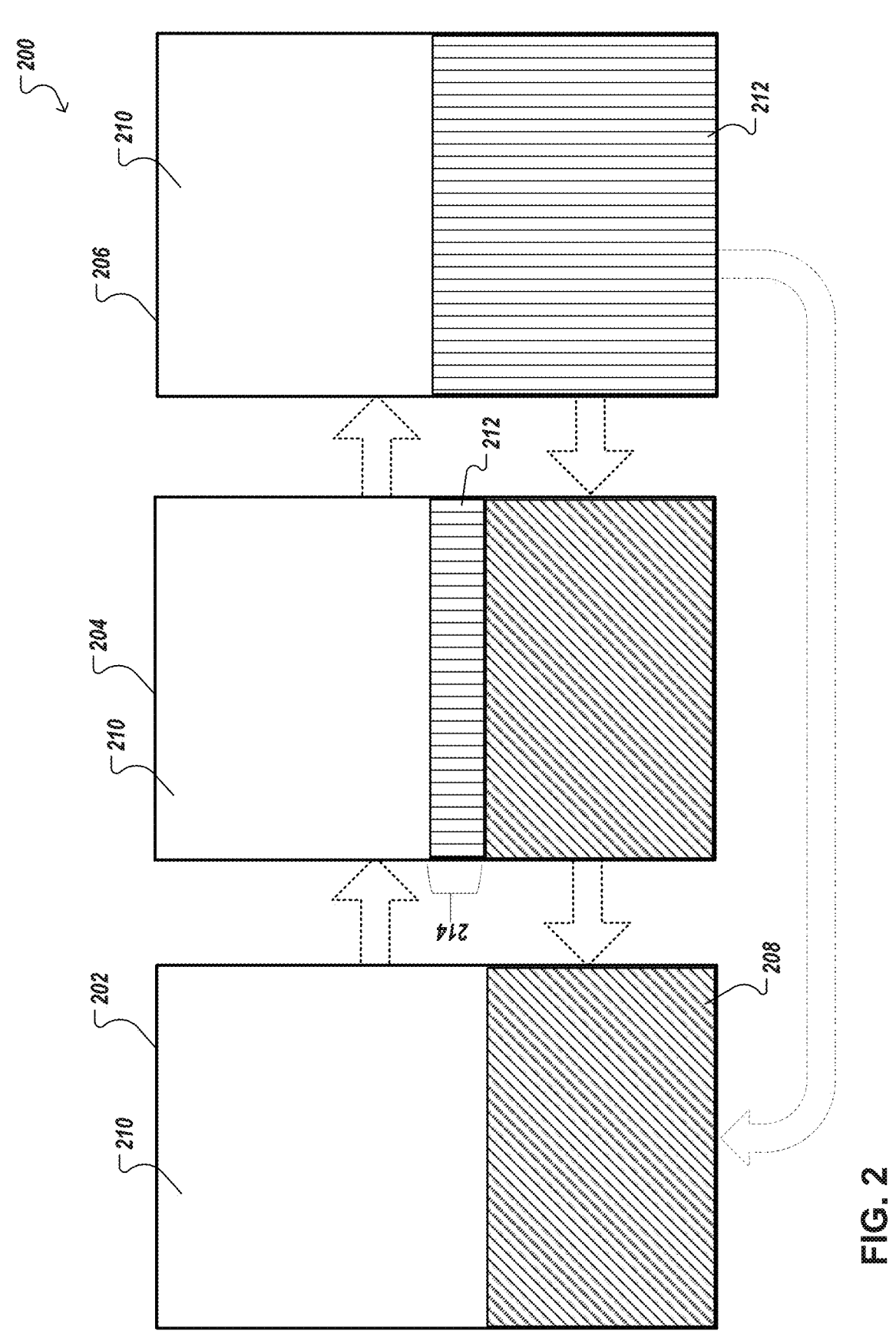
FIG. 2 is a block diagram of a series of user interfaces illustrating how different layers of the user interface can be revealed/hidden.

FIG. 2 is a block diagram of a series of user interfaces 200 illustrating how different layers of the user interface can be revealed/hidden to achieve the operations discussed with reference to FIG. 1. The series of user interfaces 200 includes an initial interface 202, an intermediate interface 204, and a final interface 206. The initial interface 202 can be a default interface that is presented when a user is interacting with a text entry portion of an application. For example, the initial interface 202 can be launched (e.g., revealed) when a user focuses on a text entry area, as discussed with reference to FIG. 1. In this example, the initial interface 202 is presenting a particular user interface layer 208 that presents a particular set of user interface elements. For example, the particular user interface layer 208 could present the keyboard area 110 of FIG. 1. In some implementations, the particular user interface layer 208 could be the only content that is defined by the particular layer, or the particular user interface layer 208 could include additional content (e.g., user interface elements) that could be located in the area 210. The area 210 could be defined in the particular user interface layer 208 or could be defined in another layer of the initial interface 202. For purposes of the present example, it will be assumed that the particular user interface layer 208 has dimensions corresponding to the shaded area of the initial interface 202, and that the area 210 is implemented in a separate layer of the initial interface 202.

The particular user interface layer 208 is visually perceptible in the initial interface 202 when the particular user interface layer 208 is revealed, unhidden, activated, and/or brought to the front of the layers of the initial interface 202. For brevity, this document refers to a user interface layer (or portion thereof) that is made visible as being revealed. As such, the particular user interface layer 208 and the area 210 of the initial interface 202 are in the revealed state. In some situations, layers of a user interface can be either wholly revealed or partially revealed. For example, to provide for varying degrees of access to user interface elements defined in a given layer, the user interface can be designed such that a specified portion (e.g., defined by coordinates and/or a reference location and size information) of the layer is revealed in certain circumstances, whereas a different portion of the layer can be revealed in other circumstances. In the present example, the particular user interface layer 208 is fully revealed, thereby revealing the user interface elements defined in the particular user interface layer 208. An example of such user interface elements that can be depicted in the particular user interface layer 208 are shown in the keyboard area 110 of FIG. 1. Generally speaking, when one layer of a user interface is revealed in a particular portion of a user interface, other layers of the user interface are not visually perceptible in that particular portion of the user interface (assuming a 0% transparency setting of the presented layer). Revealing a layer may include decreasing the transparency of that layer, whilst increasing the transparency of other layers, such that the revealed layer becomes visible. Alternatively, or additionally, revealing a layer may include configuring the user interface to receive a user input indicative of a character or symbol that is associated with (e.g., displayed in, or displayed proximal to) a user interface element of the revealed layer.

A user interface can transition from one state to another state in response to user interactions with the user interface or based on some timing condition or some other condition being met. For example, when a user device detects interaction with a user interface element presented in the initial interface 202, the user device can transition from the initial interface 202 to the intermediate interface 204. An example of this type of transition is depicted by the transition from the keyboard interface 102 to the peek view interface 104 in FIG. 1. In this example, the particular user interface layer 208 remains revealed, such that the user interface elements defined in the particular user interface layer 208 remain visually perceptible in the intermediate interface 204. This is similar to the keyboard area 110 of FIG. 1 remaining visually perceptible after the transition from the keyboard interface 102 to the peek view interface 104.

In the intermediate interface 204, a portion of a different layer 212 (e.g., different from the particular user interface layer 208 and the area 210) is revealed in a specified portion 214 of the intermediate interface 204. This is similar to the row of symbols 114 being revealed in the peek view interface 104 of FIG. 1. The portion of the different layer 212 can be revealed in a variety of ways to create a variety of different visual effects. For example, the portion of the different layer 212 could be defined to fade in (e.g., by changing opacities of the different layer 212 and the area 210 in opposite directions), or the portion of the different layer 212 could be moved from a lower location on the display (e.g., hidden behind the particular user interface layer 208) to a higher location on the screen (e.g., above the particular user interface layer 208). In some situations, the particular user interface layer 208 could be shrunken so that it no longer includes the area that is replaced by the specified portion. Assuming that the different layer 212 is defined at a higher level than the user interface than the area 210, but a lower level of the user interface than the particular user interface layer 208, this movement of the different layer 212 up the display would result in the different layer 212 being revealed as it moved out from behind the particular user interface layer 208, thereby resulting in the portion of the different layer 212 to be revealed.

As the different layer 212 is revealed in the specified portion 214, the area 210 can be animated to visually indicate that the different layer 212 is displacing the area 210. For example, as the different layer 212 is revealed, the area 210 can be moved up the display to "make room" for the portion of the different layer 212 that is revealed. This can be achieved by moving the location of the area 210 up the display based on the size of the specified portion 214 that will be occupied by the different layer 212, or by revealing a different layer in the portion of the intermediate interface 204 that remains occupied by the area 210 after the transition from the initial interface 202 to the intermediate interface 204. For example, instead of shifting the location of the area 210 within the display, the user device could hide the area 210 while revealing another layer that shows the user interface elements of the area 210 in different display locations. In either case, the resulting user interface of the intermediate interface 204 would include at least some of the user interface elements defined in the area 210, some of the user interface features defined in the different layer 212, and the entirety of the particular user interface layer 208 that was presented in the initial interface 202. The peek view interface 104 of FIG. 1 is an example of an end state of this transition from the initial interface 202 to the intermediate interface 204.

When the portion of the different layer 212 is revealed, another portion of the different layer 212 can remain hidden (or occluded by) the particular user interface layer 208 that is located in the same portion of the display as the different layer 212. In this situation, the remainder of the different layer 212 (or some other larger portion) can be revealed by way of a user interaction with the intermediate interface 204. For example, as discussed with reference to the transition from the peek view interface 104 to the symbol interface 106 of FIG. 1, a user interaction with the intermediate interface 204 can trigger a transition to the final interface 206 in which the different layer 212 is fully revealed, thereby replacing the particular user interface layer 208 that was presented in the initial interface 202 and the intermediate interface 204. When the remainder of the different layer 212 is revealed, the portion of the different layer 212 that was presented in the specified portion 214 of intermediate interface 204 can remain in the same display location, such that the transition from the intermediate interface 204 to the final interface 206 visually conveys to the user that the transition from the intermediate interface 204 to the final interface 206 is revealing the rest of the different layer 212 that was previously only partially presented.

In some implementations, as shown in the peek view interface 104 and the symbol interface 106 of FIG. 1, the user interface elements that were presented in the specified portion 214 of the intermediate interface 204 also remain in the same location to reinforce to the user that they have not transitioned to a different set of user interface features, but rather fully revealed more of the user interface features that were previewed in the specified portion 214 of the intermediate interface 204. For example, in the symbol interface 106 of FIG. 1, the symbols that are presented in the row of symbols 114 remain in the same locations and order throughout the transition from the peek view interface 104 to the symbol interface 106. This helps visually convey to the user that the remainder of the full symbol keyboard 116 that is revealed in the symbol interface 106 is a larger portion of the row of symbols 114 that was previously presented in the peek view interface 104. As such, the particular combination of user interface transitions can be used to convey implied contextual information as to what the user is viewing. This is particularly helpful in situations where the display size is limited (e.g., small), because in these situations, space used to explain what a user is viewing takes away from the features that can be presented in the limited display space.

Once the user interface has transitioned from the initial interface 202 to the intermediate interface 204, further interaction with user interface elements (or other conditions) can trigger a transition from the intermediate interface 204 to the final interface 206. An example of this type of transition is depicted by the transition from the peek view interface 104 to the symbol interface 106 in FIG. 1. In this example, a larger portion of the different layer 212 is revealed, and the particular user interface layer 208 is hidden, such that the particular user interface layer 208 is no longer visible after the transition from the intermediate interface 204 to the final interface 206. This is similar to the full symbol keyboard 116 replacing the keyboard area 110 after the transition from the peek view interface 104 to the symbol interface 106 in FIG. 1.

In the final interface 206, the remainder (or at least a larger portion) of the different layer 212 is revealed in an area where the particular user interface layer 208 was previously revealed. As discussed above, this larger portion of the different layer 212 can be revealed in a variety of ways to create a variety of different visual effects. For example, the larger portion of the different layer 212 could be defined (e.g., programmed) to fade in (e.g., by changing opacities of the different layer 212 and the area 210 in opposite directions). Alternatively, the different layer 212 could be moved to a higher level of the layers that are defined in the user interface than the particular user interface layer 208, thereby occluding the particular user interface layer 208. In some implementations, the portion of the different layer 212 that was presented in the specified portion 214 of the intermediate interface 204 will remain fixed during the transition from the intermediate interface 204 to the final interface 206, thereby visually informing the user that the remainder of the different layer 212 that is presented in the final interface 206 is a larger view of the different layer 212, e.g., rather than a different layer or set of information. As discussed above, this helps convey contextual information as to what is happening during the transition from the intermediate interface 204 to the final interface 206 without having to utilize limited display space to convey that information to the user.

After the transition to the final interface 206, further user interaction (e.g., by way of one or more user interface elements) can trigger further transitions between user interface states. For example, an interaction with the final interface 206 could trigger a transition back to the intermediate interface 204, as discussed with reference to the transition from the symbol interface 106 to the peek view interface 104 in FIG. 1, and then a subsequent interaction with the intermediate interface 204 could trigger a transition back to the initial interface 202, as discussed with reference to the transition from the peek view interface 104 to the keyboard interface 102 in FIG. 1. In another example, an interaction with the final interface 206 could trigger a transition back to the initial interface 202, as depicted by the curved arrow 216. In a further example, interaction (or some other condition, such as a timing condition) could trigger a transition to a further user interface not depicted. In any event, transitions to other user interfaces can be achieved by manipulating/adjusting the layers that are defined in the user interface and/or revealing different layers and/or portions of the layers that are defined in the user interface. For example, each user interaction (or condition) at each user interface state can be mapped to a set of layer adjustments that cause the visual transitions.

Figure 3:
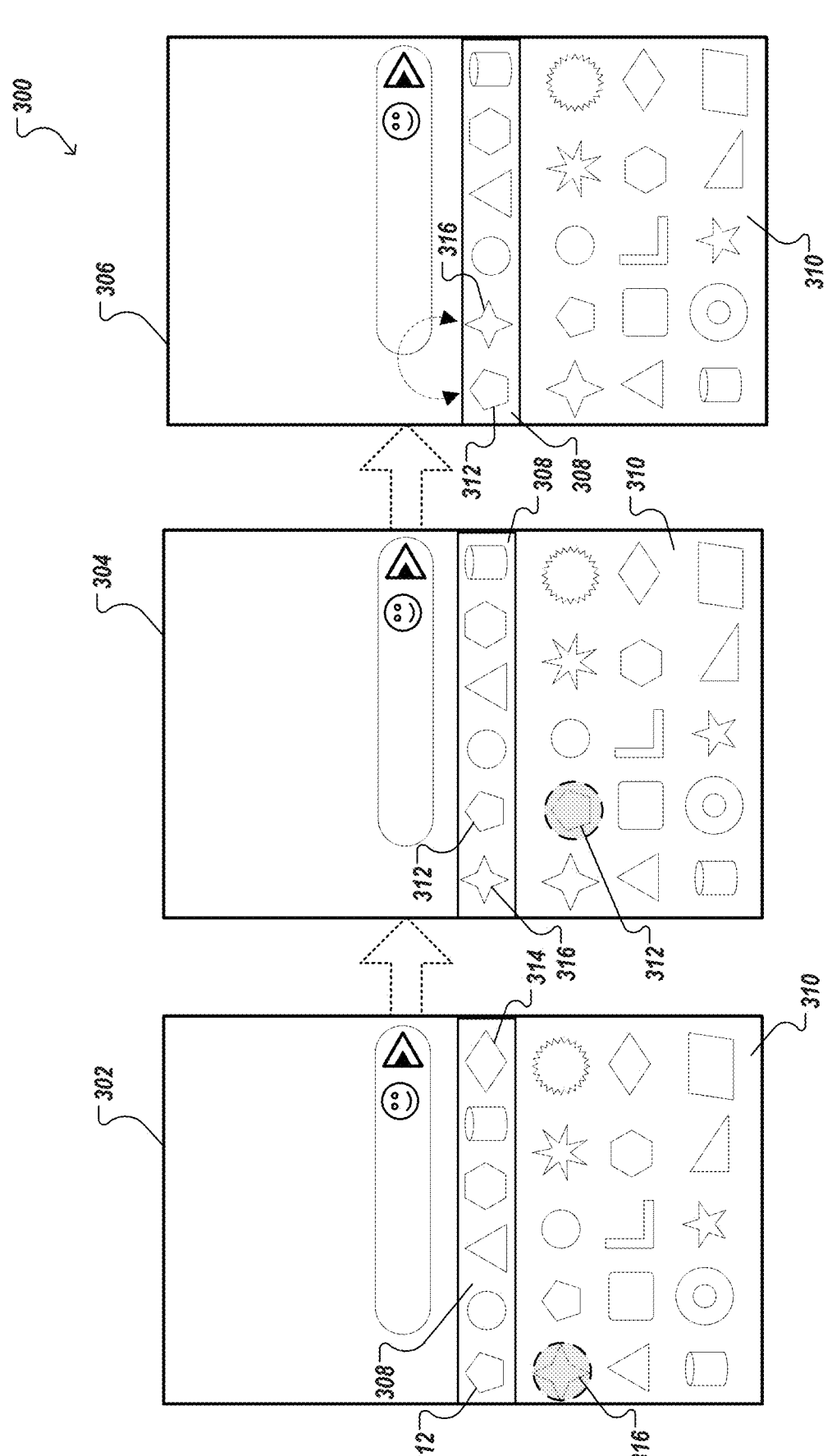
FIG. 3 is a block diagram visually illustrating an example process by which the symbols can be selected to populate a peek view (or another portion) of a user input tool.

As noted above, the symbols that are presented in the row of symbols 114 of FIG. 1 can be a set of most frequently used symbols, recently used, or otherwise suggested symbols. FIG. 3 is a block diagram 300 visually illustrating an example process by which the symbols can be selected to populate a peek view (or another portion) of a user input tool similar to that presented in the row of symbols 114 of FIG. 1. The block diagram 300 includes three display states, which will be referred to as an initial display state 302, an intermediate display state 304, and a subsequent display state 306. As used throughout this discussion, the phrase "initial display state," is used simply as a reference to the first display state being discussed and is not intended to be limited to the first ever presentation state or even an unaltered display state, but the initial display state could be the first ever presentation state or an unaltered display state.

The initial display state 302 includes a suggested symbol area 308 that includes a set of suggested symbols and a general symbol area 310. In this example, the symbols are shapes, but the symbols could be emojis, Hanzi characters, Arabic characters, web design widgets, or any other symbols. In some implementations, the suggested symbol area 308 can be a portion of the user interface that presents the highest ranking symbols among the set of most frequently used symbols, recently used, or otherwise suggested symbols. As discussed in more detail below, this ranking can be performed based on one or more of a frequency of use of the symbol, a context of the user input (e.g., an application being used, or previously entered input), and/or output of an artificial intelligence agent that selects the suggested symbols based on a variety of signals (e.g., user characteristics, time of day, context of the input, input into other applications, or other signals) that are input into the artificial intelligence agent.

For purposes of the present discussion, the general symbol area 310 is depicted as a static symbol area, such as a static symbol keyboard that includes a fixed arrangement of symbols that are entered (e.g., into a text entry field) in response to user interaction with the symbols. In other words, for purposes of the examples that follow, the set of symbols presented in the general symbol area 310 will not change. However, the general symbol area 310 could also be an extension of the suggested symbol area 308, such that the general symbol area 310 could also dynamically change in response to user interaction with the symbols, as will be discussed in more detail below.

Prior to user interaction with the general symbol area 310, the suggested symbol area 308 can be devoid of any symbols (e.g., be empty), can include a default set of symbols, or can include a user-specified set of symbols. In the present example, the suggested symbol area 308 includes a set of symbols that can be considered to have a ranking of 1 (left)-6 (right), with the ranking of 1 being considered the most prominent or most suggested symbol. As a user interacts with symbols in the general symbol area 310, the device presenting the initial display state 302 can monitor the user interactions (and/or other information) and dynamically update the suggested symbol area 308 by rearranging and/or replacing symbols that are presented in the suggested symbol area 308 based on the monitored user interactions (and/or the other information). For example, prior to user interaction with the symbols in the general symbol area 310, the pentagon shape 312 is a highest ranked symbol in the suggested symbol area 308, and the diamond shape 314 is the lowest ranked symbol in the suggested symbol area 308. Again, this initial ranking can be a default ranking, user-specified ranking, or some other ranking.

Assume for purposes of example, that the device presenting the initial display state 302 detects a user interaction with the four pointed star symbol 316 in the general symbol area 310 of the initial display state 302. Further assume that the initial ranking of the symbols in the suggested symbol area 308 is not based on frequency of use, but that after user interaction with symbols in the general symbol area 310, the suggested symbol area 308 is programmed to dynamically update based on frequency of symbol use or most recent symbol use. In this example, the user interaction with the four pointed star symbol 316 will make the four pointed star symbol 316 the most frequently used symbol (as well as the most recently used), which causes the user interface to be updated by inserting the four pointed star symbol 316 into the suggested symbol area 308 at the highest ranked position (e.g., left-most position), as shown in the intermediate display state 304. In some implementations, the insertion of the four pointed star symbol 316 at the highest ranked position will cause the symbol that was previously presented in the highest ranked position (e.g., second from the left), which in this case is the pentagon shape 312, to shift to the right to a lower ranked position, as shown in the transition from the initial display state 302 to the intermediate display state 304. When this shift occurs, the rest of the symbols that were included in the suggested symbol area 308 prior to the insertion of the four pointed star symbol 316 can also be shifted to the next lower ranked position, with the lowest ranked symbol from the initial display state 302, in this example the diamond shape 314, being removed from the suggested symbol area 308.

In some implementations, the insertion of a symbol into the suggested symbol area 308 removes that symbol from the general symbol area 310, which reduces redundancy in the symbols presented. With reference to the example above, the insertion of the four pointed star symbol 316 into the suggested symbol area 308 can result in removal of the four pointed star symbol 316 from the general symbol area 310. In these situations, the remaining symbols in the general symbol area 310 can be rearranged in response to the removal of the four pointed star symbol 316 (or another symbol) from the general symbol area 310. For example, the symbols can be shifted over and/or up to occupy the position of the general symbol area 310 that was occupied by the four pointed star symbol 316. Additionally, a new symbol (or the symbol that was displaced from the suggested symbol area 308) can be moved from the suggested symbol area 308 to the general symbol area 310. The position of the general symbol area 310 occupied by the symbol removed from the suggested symbol area 308 can be either the position previously occupied by the symbol that was inserted into the suggested symbol area 308 or another position.

The transition from the initial display state 302 to the intermediate display state 304 can occur while the suggested symbol area 308 and general symbol area 310 continue to be presented, or the transition from the initial display state 302 to the intermediate display state 304 can occur after the suggested symbol area 308 and/or general symbol area 310 have been removed (e.g., hidden) in the user interface. In other words, the transition between the initial display state 302 and the intermediate display state 304 can occur while the user continues to use the suggested symbol area 308 and general symbol area 310, or the transition can occur after the user closes the suggested symbol area 308 and general symbol area 310. Transitioning from the initial display state 302 to the intermediate display state 304 while the suggested symbol area 308 and general symbol area 310 continue to be presented provides additional visual communication to the user as to how the suggested symbol area 308 is arranged and/or the significance of those symbols without having to utilize the limited screen space to convey that information in other ways.

After the transition from the initial display state 302 to the intermediate display state 304, the device presenting the intermediate display state 304 can continue to monitor user interactions with the user interface (and/or other information), re-rank symbols based on the monitored user interactions (and/or other information) and update the order of the symbols presented in the suggested symbol area 308 (and/or general symbol area 310). For example, after the transition from the initial display state 302 to the intermediate display state 304, assume that the device detects user interaction with the pentagon symbol pentagon shape 312 one or more times. This interaction with the pentagon shape 312 can trigger the device to re-rank the symbols (discussed in more detail below), and update the symbols presented in the suggested symbol area 308. For example, assume that the detected interaction causes the pentagon shape 312 to be ranked higher than the four pointed star symbol 316. In this example, the suggested symbol area 308 can be updated to swap the positions of the pentagon shape 312 and the four pointed star symbol 316, as visually indicated in the transition from the intermediate display state 304 to the subsequent display state 306.

Figure 4:
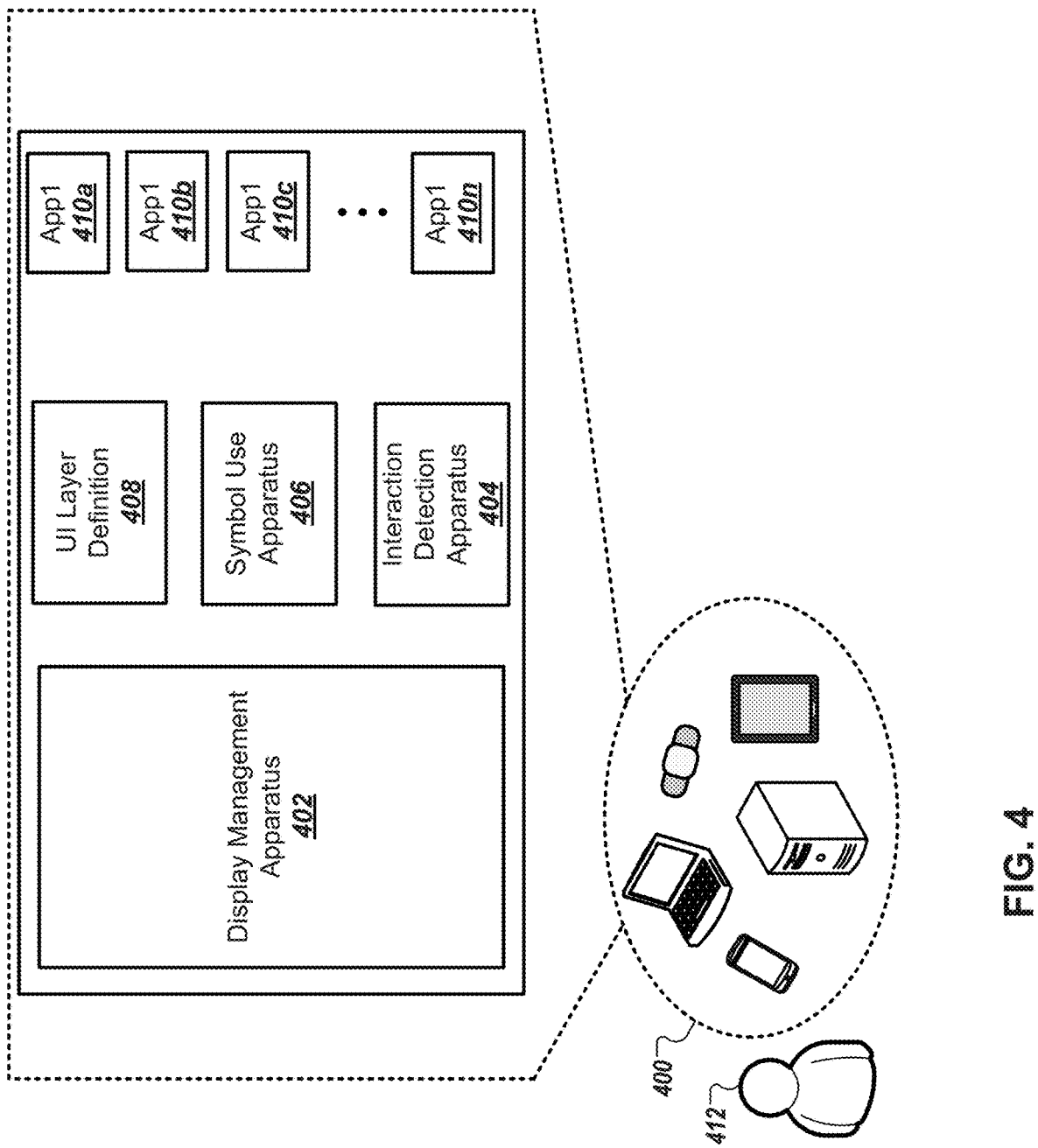
FIG. 4 is a block diagram of an example system that can perform the ranking and/or updates to the user interface discussed throughout this document.

As noted above, the updating of the arrangement of symbols presented in the suggested symbol area 308 (and/or row of symbols 114 of FIG. 1) can be based on a symbol ranking. The symbol ranking can be performed, for example, by a device that presents the suggested symbol area 308 (e.g., mobile device, tablet device, wearable computing device, or desktop device) or by a server side device that is in communication with the device presents the suggested symbol area 308. FIG. 4 is a block diagram of an example system 400 that can perform the ranking and/or updates to the user interface discussed throughout this document. The system 400 can be implemented, for example, in a mobile device, tablet device, wearable device (e.g., smartwatch), or another computing device).

The system 400 includes a display management apparatus 402, an interaction apparatus 404, a symbol use apparatus 406, a UI Layer Definition 408, and native applications 410a-410n. The system 400 can also include a network interface that facilitates communication with networked devices, such as user devices and/or server devices.

The display management apparatus 402 includes one or more data processing apparatus and is configured to monitor interactions (e.g., interactions by a user 412) with user interfaces presented by the system 400. For example, the display management apparatus 402 can accept data specifying user interactions with the user interfaces presented by the display management apparatus 402, evaluate actions to take in response to the user interactions, and update presentation of user interfaces presented by the system 400, as discussed in more detail below.

The interaction apparatus 404 detects user interactions with a display of the system 400. For example, the interaction apparatus 404 can be connected to, or part of, a touch display that detects user interaction with the touch display. The interaction apparatus 404 can also receive signals indicating other user interactions (e.g., from device peripherals), such as user clicks on elements of user interfaces, wireless pencil taps or movements, or other user interactions with the elements of the user interfaces. The interaction apparatus 404 can accept these signals that are indicative of the user interactions and provide interaction data to the display management apparatus 402. The interaction data can specify, for example, a type of user interaction that occurred (e.g., click, tap, swipe, pinch, or other type of interaction), as well as a user interface element with which the interaction occurred (e.g., a button, symbol, drop down menu, icon, etc.). In some implementations, the interaction data can also specify which native application was in focus or active when the user interaction occurred and/or a state of the native application when the interaction occurred.

The display management apparatus 402 receives the interaction data from the interaction apparatus 404 and processes the information based on one or more rules in order to take action. In some implementations, the display management apparatus 402 can classify the interaction based on the type of interaction and the user interface element with which the interaction occurred to determine whether the interaction was with a symbol as input to an application. For example, assume that the interaction data received from the interaction apparatus 404 indicates that the interaction is a tap interaction on the symbol pentagon shape 312 of FIG. 3, while the application 410a was active. In this example, the display management apparatus 402 can classify this as a symbol interaction, and pass symbol usage data to the symbol use apparatus 406. The symbol usage data can include, for example, a symbol that was interacted with, any of the information provided to the display management apparatus 402 in the interaction data as well as additional information. The additional information can include, for example, contextual data such as time of day information, day of week information, and/or characteristics (e.g., profile information, application usage data, etc.) corresponding to the user 412.

The symbol use apparatus 406 can store the symbol usage data on a per-application basis. For example, the symbol use apparatus 406 can store each symbol interaction that was detected while the application 410a was active with a reference to the application 410a. Similarly, the symbol use apparatus 406 can store symbol interactions that were detected while the application 410b was active with a reference to the application 410b. The symbol use apparatus 406 can also store the symbol interactions with timestamps indicating a time at which the symbols were interacted with.

The display management apparatus 402 can use the symbol usage data to rank symbols. For example, the display management apparatus 402 can rank symbols based on the frequency of use. For example, the display management apparatus 402 can determine how many times each symbol was interacted with based on the symbol usage data. In one example, the display management apparatus 402 can count the number of interactions with each given symbol that have been stored by the symbol use apparatus 406. In another example, the symbol use apparatus 406 can update a usage counter for each symbol as symbol usage data specifying usage with each symbol is received, and the display management apparatus 402 can read the value of the counter for each symbol. Using the number of interactions with the symbols, the display management apparatus 402 can assign ranks (e.g., 1-x) to the symbols in descending order of frequency of use, with the rank of 1 being highest. In turn, the display management apparatus 402 can update how the symbols are presented based on the ranking, as discussed above with reference to FIGS. 1-3.

In some implementations, the rankings can be determined on a per-application basis using the frequency of use of those symbols when using each specific application. In some implementations, the rankings can be determined based on aggregate symbol usage across multiple applications. The aggregate symbol usage can take into account, for example, symbol usage on all applications installed in the system 400, or fewer than all of those applications. For example, the display management apparatus 402 can determine the aggregate usage on a per-application-category basis, such as for game apps, texting apps, social media apps, or other categories of applications, and create rankings on a per-application-category basis as well.

The display management apparatus 402 can use the rankings created based on the aggregate symbol usage to update (or initialize) the "peek view" that is displayed for any applications that correspond to the aggregate symbol usage. For example, if the rankings are based on an application category basis, the rankings can be used to arrange symbols for newly installed applications that are included in that category to initially arrange the symbols in a peek-view interface (e.g., peek view interface peek view interface 104 of FIG. 1).

The display management apparatus 402 can rank symbols based on other or additional information. For example, the display management apparatus 402 can rank the symbols based on how recently the symbols were used, e.g., with the most recently used symbols being ranked highest and placed in the highest ranked display positions, as discussed above with reference to FIG. 3.

The display management apparatus 402 can also rank or adjust rankings based on a combination of features or information. For example, the display management apparatus 402 can implement a weighted function that determines a ranking score based on a summed product of a value for each respective feature (e.g., frequency of use, recency of use, or other features) and the weightings assigned to the respective features. The ranking score can then be used to rank and present the symbols in a manner similar to that discussed above.

In some implementations, the ranking of symbols can be performed and/or adjusted based on the output of an artificial intelligence agent that generates the rankings based on a prediction of symbols that are most likely to be used by the user 412 of the system 400. For example, any of the data discussed above (or other data) can be input to an artificial intelligence agent that has been trained to predict those symbols that are most likely to be used by users in various contexts. The output of the artificial intelligence agent can be used to rank and present the symbols according to the predictions. The artificial intelligence agent can be trained to predict the most likely symbol that will be selected, for example, using a supervised learning technique, with each symbol being a classification.

The system 400 also includes a UI layer definition 408, which the display management apparatus 402 can use to implement the UI transitions discussed above with reference to FIGS. 1-3. The UI Layer Definition 408 can define the structure and UI components for each UI layer of a user interface. For example, with reference to FIG. 2, the UI Layer Definition 408 can define the size and/or orientation of each layer relative to other layers, UI elements that are presented in each UI layer, a default order of the layers. The UI Layer Definition 408 can also include instructions that specify how to rearrange and/or reveal layers of the user interface in response to user interactions with the user interface. For example, the instructions can specify the layers and/or portions of layers that are moved and/or revealed to achieve the animation discussed with reference to FIGS. 1-2.

When the display management apparatus 402 receives interaction data indicating a specific user interaction with a user interface, the display management apparatus 402 can utilize the UI Layer Definition 408 to execute the instructions that are mapped to the specific user interaction and update the user interface based on those instructions. For example, with reference to FIG. 1, when the display management apparatus 402 receives interaction data indicating the user interaction with the smiley face emoji 112 of the keyboard interface 102, the display management apparatus 402 can access the UI Layer Definition 408 to determine how to modify the arrangement of layers of the user interface to implement the transition from the keyboard interface 102 to the peek view interface 104. More specifically, the display management apparatus 402 can identify instructions that are mapped to the specific user interaction that occurred and the user interface state of the application that existed at the time of the user interaction. Once the display management apparatus 402 has identified the instructions, the display management apparatus 402 modifies the user interface in accordance with the instructions to transition the keyboard interface 102 to the peek view interface 104 in a manner discussed above with respect to FIG. 1.

FIG. 5 is a flow chart of an example process 500 for implementing the user interfaces and transitions discussed above. The process 500 can be performed by one or more data processing apparatus, such as apparatus 400 discussed above. The process can also be implemented as instructions stored on a non-transitory computer readable medium. The instructions can be executed by one or more data processing apparatus. Execution of the instructions can cause the one or more data processing apparatus to perform operations of the process 500.

A keyboard layer of a user interface is presented (502). The keyboard layer is a layer of the user interface that presents a keyboard. The keyboard can be, for example, a QWERTY keyboard or another keyboard that facilitates input by a user. The keyboard area 110 of FIG. 1 is an example of a keyboard layer that is presented in a user interface. In some implementations, the keyboard layer is revealed in response to user interaction with a keyboard icon or a text entry field of the user interface.

An initial interaction with a given user interface element is detected (504). The initial interaction can be a first ever user interaction with the given user interface (e.g., by a particular user after installation of an application), the first user action during a current user session with the user interface, or simply a reference interaction for determining relative positions and times of other user interactions.

A first portion of a symbol layer of the user interface is revealed in response to the initial interaction while maintaining presentation of the keyboard layer of the user interface (506). In some implementations, the first portion of the symbol layer is revealed by shifting a location of the symbol layer so that the first portion is no longer occluded by another layer of the user interface, as discussed above. In some implementations, the first portion of the symbol layer is revealed by adjusting transparency settings for various portions of the layers of the user interface, as discussed above. The first portion of the symbol layer that is revealed can be, for example, at least one row of frequently used symbols. The first portion of the symbol layer can be revealed at a location of the user interface that is above the presentation of the keyboard, as shown, for example, in FIG. 1. The first portion of the symbol layer that is revealed can reveal at least one row of emojis, Hanzi characters, shapes, or web design widgets.

A set of symbols that are presented in the first portion of the symbol layer are selected (508). In some implementations, the selection of the set of symbols is selected based on a frequency of use of symbols that are included in the larger portion of the symbol layer. For example, as discussed with reference to FIGS. 3 and 4, the symbols can be ranked based on their frequency of use, and the set of symbols can be selected to include a specified number of the highest ranking symbols. More specifically, the particular having the highest frequency of use can be identified in a manner similar to that discussed above with reference to FIG. 4. In some implementations, the particular symbol having the highest frequency of use is identified based on frequency of use data (e.g., symbol use data and/or interaction data) collected from a different application than a particular application that is presenting the first portion of the symbol layer, as discussed above with reference to FIG. 4. The particular symbol having the highest frequency of use can be presented at a first position (e.g., highest ranked position) of the symbol layer.

In some implementations, a set of additional symbols are identified, where each of the additional symbols have a frequency of use that is lower than the frequency of use of the particular symbol. In some implementations, the set of additional symbols are presented in other positions of the first portion of the symbol layer, for example, as discussed with reference to FIG. 3. The selection of the set of symbols can occur at any time leading up to the initial interaction or even in response to the initial interaction.

In some implementations, the first portion of the symbol layer is initially populated with a default set of symbols (e.g., prior to user interaction with the symbol layer, as discussed above. The default set of symbols can be determined, or selected, based on one or more of a machine learning model, such as the artificial intelligence agent discussed above, that provides a set of recommended symbols, contextual information about a current user session, or based on a set of user-specified preferences.

The first portion of the symbol layer can be updated in response to an initial set of user interactions with the symbol layer. For example, the update can cause the particular symbol having the highest frequency of use to be presented at the first position of the first portion of the symbol layer while the first portion of the symbol layer remains presented, as discussed above with reference to FIG. 3.

A subsequent interaction with the given user interface element is detected (510). The subsequent interaction can be detected in a manner similar to that discussed above. The given user interaction can be, for example, a tap or click on the smiley face emoji 112 of FIG. 1.

In response to detecting the subsequent interaction, a larger portion of the symbol layer of the user interface is revealed (512). In some implementations, the larger portion of the symbol layer is revealed while maintaining a position of the first portion of the symbol layer that was previously revealed in response to detecting the initial interaction. The revealing of the larger portion of the symbol layer can occlude at least a portion of the keyboard layer, as discussed in detail with reference to FIGS. 1 and 2. In some implementations, as the user continues to interact with the same given user interface element (e.g., the smiley face emoji 112 of FIG. 1), the user interface can continue to cycle between multiple different user interface states, which can include three or more different user interface states. In a specific example, the portion of a particular keyboard that is revealed can vary as the user interface cycles between the various user interface states.

FIG. 6 is a block diagram of an example computer system 600 that can be used to perform operations described above.

The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer, and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

A computer program may but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:

displaying, in a user interface, a keyboard layer of a user interface that includes a keyboard having at least one user interface element configured to receive alpha-numeric user input;

detecting an initial interaction at a given user interface element that is visually depicted as a symbol other than alpha-numeric characters of the keyboard;

initiating for display, in response to detecting the initial interaction at the given user interface element, a first portion of a symbol layer in a first area of the user interface while maintaining display of the keyboard layer of the user interface, the symbol layer having at least one user interface element configured to receive a user input for inputting a symbol, the user interface element being selected based on a frequency of use of the symbol;

detecting a subsequent interaction at the given user interface element while the first portion of the symbol layer is presented in the first area of the user interface;

increasing, in response to detecting the subsequent interaction at the given user interface element, a size of the symbol layer that is presented in an expanded area of the user interface, wherein the expanded area of the user interface is a larger portion of the user interface than the first area of the user interface in which the first portion of the symbol layer was presented, the expanded area containing additional interface elements configured to receive a user input for inputting a symbol;

wherein revealing the larger portion of the user interface occludes at least a portion of the keyboard layer.

2. The method of claim 1, wherein presenting a first portion of a symbol layer comprises revealing at least one row of user interface elements, each user interface element in the row being configured to receive a user input indicative of a frequently used symbol, and wherein the row is displayed at a location above the keyboard.

3. The method of claim 1, wherein presenting a first portion of a symbol layer comprises revealing at least one row of user interface elements, each user interface element in the row being configured to receive a user input indicative of an emoji, a Hanzi character, a shape, or a web design widget.

4. The method of claim 1, further comprising selecting a set of symbols that are included in the first portion of the symbol layer based on a frequency of use of symbols that are included in the expanded area of the user interface.

5. The method of claim 4, wherein selecting the set of symbols comprises:

identifying a particular symbol having a highest frequency of use;

including a user interface element configured to receive a user input indicative of the particular symbol at a first position of the first portion of the symbol layer;

identifying a set of additional symbols each having a frequency of use that is lower than the particular symbol, but higher than remaining symbols in the symbol layer; and including a plurality of user interface elements each configured to receive a user input indicative of a respective one of the set of additional symbols in other positions of the first portion of the symbol layer.

6. The method of claim 5, further comprising:

prior to receiving a user input at the symbol layer, initially populating the first portion of the symbol layer with a default set of symbols;

in response to an initial set of user inputs at the symbol layer, updating the first portion of the symbol layer to include a user interface element configured to receive the user input indicative of the particular symbol having the highest frequency of use at the first position of the first portion of the symbol layer while the first portion of the symbol layer remains displayed.

7. The method of claim 6, further comprising determining the default set of symbols based on one or more of a machine learning model that provides a set of recommended symbols, contextual information about a current user session, or based on a set of user-specified preferences.

8. The method of claim 5, wherein identifying the particular symbol having the highest frequency of use is performed based on frequency of use data collected from a different application than a particular application that causes the first portion of the symbol layer to be displayed.

9. A non-transitory computer readable medium storing instructions that, when executed by one or more data processing apparatus, cause the one or more data processing apparatus to perform operations comprising, comprising:

displaying, in a user interface, a keyboard layer of a user interface that includes a keyboard having at least one user interface element configured to receive alpha-numeric user input;

detecting an initial interaction at a given user interface element that is visually depicted as a symbol other than alpha-numeric characters of the keyboard;

initiating for display, in response to detecting the initial interaction at the given user interface element, a first portion of a symbol layer in a first area of the user interface while maintaining display of the keyboard layer of the user interface, the symbol layer having at least one user interface element configured to receive a user input for inputting a symbol, the user interface element being selected based on a frequency of use of the symbol;

detecting a subsequent interaction at the given user interface element while the first portion of the symbol layer is presented in the first area of the user interface;

increasing, in response to detecting the subsequent interaction at the given user interface element, a size of the symbol layer that is presented in an expanded area of the user interface, wherein the expanded area of the user interface is a larger portion of the user interface than the first area of the user interface in which the first portion of the symbol layer was presented, the expanded area containing additional interface elements configured to receive a user input for inputting a symbol;

wherein revealing the larger portion of the user interface occludes at least a portion of the keyboard layer.

10. The non-transitory computer readable medium of claim 9, wherein presenting a first portion of a symbol layer comprises revealing at least one row of user interface elements, each user interface element in the row being configured to receive a user input indicative of a frequently used symbol, and wherein the row is displayed at a location above the keyboard.

11. The non-transitory computer readable medium of claim 9, wherein presenting a first portion of a symbol layer comprises revealing at least one row of user interface elements, each user interface element in the row being configured to receive a user input indicative of an emoji, a Hanzi character, a shape, or a web design widget.

12. The non-transitory computer readable medium of claim 9, wherein the instructions cause the one or more data processing apparatus to perform operations further comprising selecting a set of symbols that are included in the first portion of the symbol layer based on a frequency of use of symbols that are included in the expanded area of the user interface.

13. The non-transitory computer readable medium of claim 12, wherein selecting the set of symbols comprises:

identifying a particular symbol having a highest frequency of use;

including a user interface element configured to receive a user input indicative of the particular symbol at a first position of the first portion of the symbol layer;

identifying a set of additional symbols each having a frequency of use that is lower than the particular symbol, but higher than remaining symbols in the symbol layer; and including a plurality of user interface elements each configured to receive a user input indicative of a respective one of the set of additional symbols in other positions of the first portion of the symbol layer.

14. The non-transitory computer readable medium of claim 13, wherein the instructions cause the one or more data processing apparatus to perform operations further comprising:

prior to receiving a user input at the symbol layer, initially populating the first portion of the symbol layer with a default set of symbols;

in response to an initial set of user inputs at the symbol layer, updating the first portion of the symbol layer to include a user interface element configured to receive the user input indicative of the particular symbol having the highest frequency of use at the first position of the first portion of the symbol layer while the first portion of the symbol layer remains displayed.

15. The non-transitory computer readable medium of claim 14, wherein the instructions cause the one or more data processing apparatus to perform operations further comprising determining the default set of symbols based on one or more of a machine learning model that provides a set of recommended symbols, contextual information about a current user session, or based on a set of user-specified preferences.

16. A system, comprising:

a data storage device; and one or more processors configured to interact with the data storage device and execute instructions that cause the one or more processors to perform operations comprising:

displaying, in a user interface, a keyboard layer of a user interface that includes a keyboard having at least one user interface element configured to receive alpha-numeric user input;

detecting an initial interaction at a given user interface element that is visually depicted as a symbol other than alpha-numeric characters of the keyboard;

initiating for display, in response to detecting the initial interaction at the given user interface element, a first portion of a symbol layer in a first area of the user interface while maintaining display of the keyboard layer of the user interface, the symbol layer having at least one user interface element configured to receive a user input for inputting a symbol, the user interface element being selected based on a frequency of use of the symbol;

detecting a subsequent interaction at the given user interface element while the first portion of the symbol layer is presented in the first area of the user interface;

increasing, in response to detecting the subsequent interaction at the given user interface element, a size of the symbol layer that is presented in an expanded area of the user interface, wherein the expanded area of the user interface is a larger portion of the user interface than the first area of the user interface in which the first portion of the symbol layer was presented, the expanded area containing additional interface elements configured to receive a user input for inputting a symbol;

wherein revealing the larger portion of the user interface occludes at least a portion of the keyboard layer.

17. The system medium of claim 16, wherein presenting a first portion of a symbol layer comprises revealing at least one row of user interface elements, each user interface element in the row being configured to receive a user input indicative of a frequently used symbol, and wherein the row is displayed at a location above the keyboard.

18. The system of claim 16, wherein presenting a first portion of a symbol layer comprises revealing at least one row of user interface elements, each user interface element in the row being configured to receive a user input indicative of an emoji, a Hanzi character, a shape, or a web design widget.

19. The system of claim 16, wherein the instructions cause the one or more processors to perform operations further comprising selecting a set of symbols that are included in the first portion of the symbol layer based on a frequency of use of symbols that are included in the expanded area of the user interface.

20. The system of claim 19, wherein selecting the set of symbols comprises:

identifying a particular symbol having a highest frequency of use;

including a user interface element configured to receive a user input indicative of the particular symbol at a first position of the first portion of the symbol layer;

identifying a set of additional symbols each having a frequency of use that is lower than the particular symbol, but higher than remaining symbols in the symbol layer; and including a plurality of user interface elements each configured to receive a user input indicative of a respective one of the set of additional symbols in other positions of the first portion of the symbol layer.

* * * * *